United States Patent [19]

Watanabe et al.

[11] Patent Number: 4,641,342
[45] Date of Patent: Feb. 3, 1987

[54] VOICE INPUT SYSTEM

[75] Inventors: Takao Watanabe; Masao Watari, both of Tokyo, Japan

[73] Assignee: NEC Corporation, Tokyo, Japan

[21] Appl. No.: 590,660

[22] Filed: Mar. 19, 1984

[30] Foreign Application Priority Data

Mar. 17, 1983 [JP] Japan .................................. 58-44741
Feb. 8, 1984 [JP] Japan .................................. 59-21115

[51] Int. Cl.⁴ ............................................... G10L 5/00
[52] U.S. Cl. ....................................... 381/41; 381/46; 381/43; 381/53
[58] Field of Search .................................. 381/41–43, 381/46, 49; 364/466; 360/72.1

[56] References Cited

U.S. PATENT DOCUMENTS

| | | | |
|---|---|---|---|
| 4,237,497 | 12/1980 | Trevithick | 360/72.1 |
| 4,365,112 | 12/1982 | Reuther et al. | 381/46 |
| 4,385,359 | 5/1983 | Watari et al. | 381/43 |
| 4,556,944 | 12/1985 | Daniels et al. | 364/466 |

*Primary Examiner*—E. S. Matt Kemeny
*Attorney, Agent, or Firm*—Sughrue, Mion, Zinn, Macpeak, and Seas

[57] ABSTRACT

An input system for a voice recognizer circuit wherein a cue signal is issued to the user to indicate system readiness. A voice detector detects the presence of a voice signal. Control circuitry detects if a voice signal is detected prior to the end of the initial cue signal and, if so, causes a second cue signal to be issued, thereby preventing a loss of voice input. The voice detector can also be used to selectively switch an active one of a plurality of user channels to one of a smaller number of voice recognizers.

8 Claims, 9 Drawing Figures

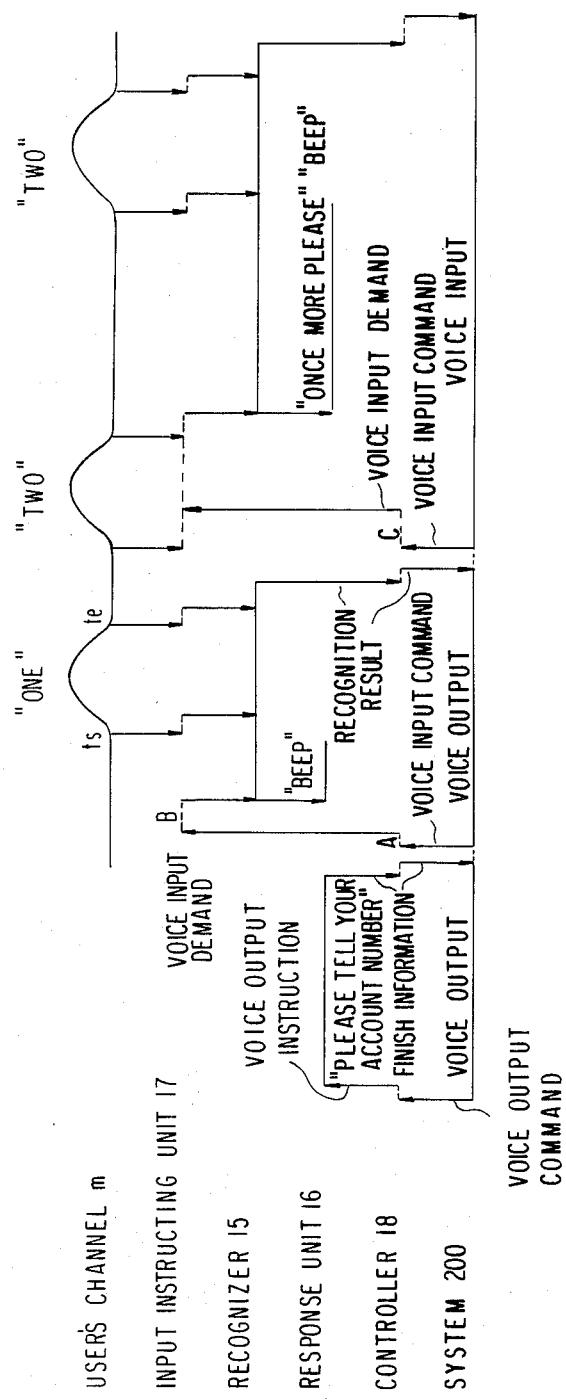

VOICE INPUT SYSTEM

BACKGROUND OF THE INVENTION

The present invention relates to an improvement in a voice input system.

Voice input systems are very helpful input means for persons because of their ease of use, and have been already put into practical use in various fields such as in an inquiry system which responds to users.

In the voice input system, it is a matter of great significance that users speak with proper timing. Usually, the voice input system is provided with means for announcement or signal sound such as "Beep" or with display means for displaying a visible signal, in order to inform the user that the system is ready to receive the voice input. Though a well-trained user would be able to speak synchronously with the input cue, it is difficult for untrained persons to speak with proper timing because the untrained persons do not have experience with the timing for the system. Therefore, they often speak before the input cue is given. In such a case, whatever is spoken before the system is prepared to receive the input is undesirably lost, resulting in a mis-recognition or rejection of the inputted voice.

SUMMARY

Accordingly, an object of the invention is to provide a voice input system improved to avoid a mis-recognition or a rejection even when a user has spoken before the input cue is given, thereby enhancing the ease of use of this system.

Another object of the invention is to provide a voice input system in which the number of the voice recognition processing means is reduced below the number of the user channels which are provided with the system, thereby simplifying the hardware structure.

According to this invention, there is provided a voice input system comprising an input cue signal generating means adapted to give a cue signal informing the user that the system is ready to receive the voice input, a voice detection means adapted to produce a detection signal when the voice signal is being inputted, an input instructing means adapted to produce a detection signal when the voice signal is being inputted, an input instructing means adapted to instruct the cue signal generating means to re-issue the input cue signal when the detection signal exists prior to the end of the input cueing signal, and a voice processing means for effecting predetermined processing such as recognition processing on the inputted voice signal.

BRIEF DESCRIPTION OF THE DRAWINGS

FIG. 4 is a chart explanatory of the operation of the embodiment shown in FIG. 3;

DESCRIPTION OF THE PREFERRED EMBODIMENTS

Figure 1:
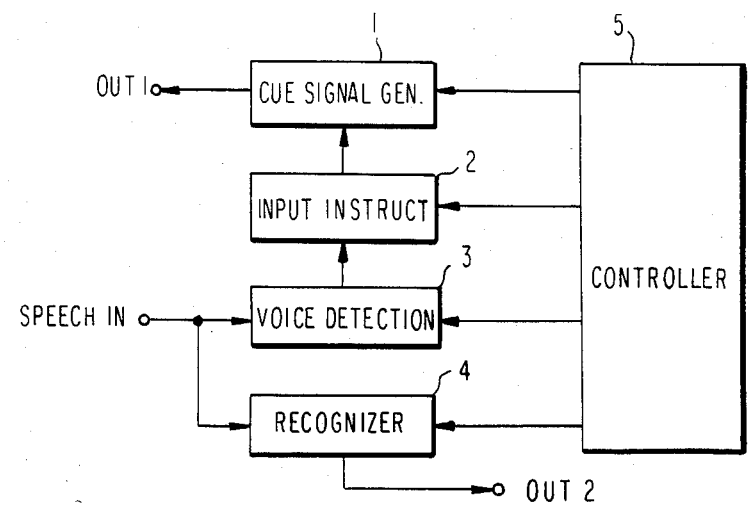
FIG. 1 is a block diagram showing the basic arrangement of the system in accordance with the invention.

As clearly shown in FIG. 1, the voice input system of the invention is composed mainly of an input cue signal generating means 1 adapted to give a cue signal informing the user that the system is ready to receive the voice input, a voice detecting means 3 adapted to judge whether the voice signal is being inputted, an input instructing means 2 adapted to order the input cue signal generating means to reissue the input cue signal when a voice input is detected by the voice detecting means 3 prior to the end of the input cueing signal, a voice recognition means 4 for recognizing the inputted voice, and a control means 5 for controlling the operation of the necessary means.

To explain in more detail, the input cue signal generating means 1 generates an input cue signal at its output terminal OUT1, upon receipt of an instruction given by the controller 5. The input cue signal can have any suitable form such as an audible signal "Beep", voice response, visible display or the like. In the following description, the input cue signal is assumed to be a "Beep".

The voice detecting means 3 can be one of any type provided that it is capable of judging the presence or absence of a voice signal on the voice input termal SPEECH IN. For instance, the voice detecting means 3 may be adapted to judge the existence of a voice input when the input level exceeds a predetermined threshold level. The input instructing means 2 instructs the input cue signal generating means 1 to repeat the input cue signal, if at the instant just before the generation of the input cue signal appointed by the control means 5, i.e. at the moment just before the generation of the first "Beep", there exists an active signal from the voice detecting means 3. The time flow of this operation is shown in FIG. 2.

Figure 2:
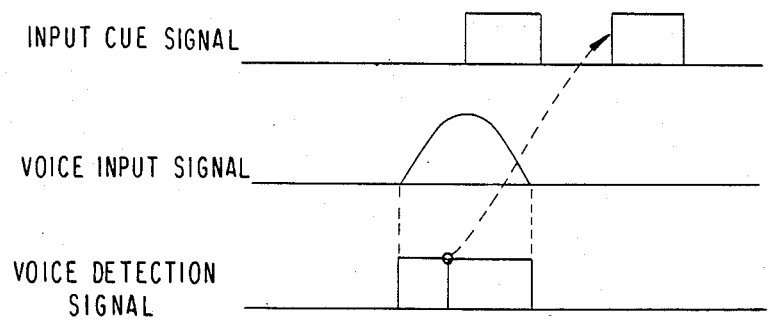
FIG. 2 is a chart explanatory of the operation of the basic arrangement as shown in FIG. 1.

In FIG. 2, the axis of the abscissa represents time, while the axis of the ordinate represents the signal levels. The uppermost, intermediate and the lowermost signals show, respectively, the input cue signal, the voice input signal and the voice detection signal. The arrow mark with broken line indicates that an instruction is given to repeat or re-issue the input cue signal because of voice detection immediately before the generation of the first input cue signal. The controller 5 is adapted to control the voice recognition means 4 to start the recognition operation after the generation of the input cue signal. When the recognition start instruction is received in the voice recognition means 4, the previously started recognition operation is stopped and a new recognition operation is started. The result of the recognition is given on the output terminal OUT2. Any known type of recognition unit can be used as the recognition means of the invention.

Although the "Beep" is used as the input cue signal in the described embodiment, it will be clear to those skilled in the art that the same arrangement as described above can be used in the form of a voice or visible display in place of the "Beep". Namely, which one of the "Beep", voice and visible display is to be used depends on the use of the system. For instance, the visible display cannot be used when voice input is obtained through a telephone. The input cue signal in the form of a voice indicator is suited to the case where the system is to be used by many different persons who are not accustomed to use the system and require guidance as to how to use the system. The input cue signal by voice response, however, takes a considerable time so that the "Beep" is preferred when the system is used only by specific persons. It is of course possible to use these input cue signals simultaneously in combination.

In the described embodiment, a separate voice detecting means is used for realizing the voice detecting function. However, if the voice detecting function is involved also in the voice recognition means, it is possible to use the function involved in the recognition means.

The system of the invention can be used, for example, in an inquiry system adapted to respond to the inquiries of users inputted through a telephone. More specifically, this inquiry system is adapted to automatically recognize the user's voice and to respond to the user by a voice output. Such an inquiry system is required to receive the voice inputs from as many users as possible and simultaneously serve as many users as possible by responding by voice. This, however, requires the same number of recognition means as the number of the user channels. The recognition means, however, has to conduct various processing operations and to employ many memories, rendering the system complicated and large in size.

The specification of the U.S. Pat. No. 4,385,359 discloses a method which is effective in reducing the number of the recognition means. This method is generally as follows. Namely, each user utilizes a voice input and voice output, so that, while the voice output is being issued, the recognition means is not used. This period is idle time for the recognition unit. In order to make use of this idle time for the processing of voice input from other user channel, a change-over switch is provided between the user's circuit and the recognition input terminals so that only the user channel requesting the voice input is connected to the recognition means. However, since the number of processing circuits simultaneously operable in the recognition means is n which is smaller than m, it is necessary to effect a control such that the number of concurrent voice input requests does not exceed n. To accomplish this end, in this method, the input cue signal, which is in this case a voice output informing the user that the system is ready to receive the voice input, is given only when there is an idle recognition input terminal. With this arrangement, it is possible to simultaneously serve m users through the receipt of voice input and delivery of the voice output by providing recognition means of the number n, which is smaller than the number m of the users.

Another embodiment of the invention applies to the system having a multiplicity of user channels as in in the case of the above-described inquiry system. In this embodiment, a change-over switch is provided at the preceding stage of the voice recognition processing means to permit a time-sharing use of the voice recognition means. The voice input/output device adapted to issue an input cue signal for informing the user of the timing of the voice input is provided with both a detection means for detecting the user's voice before the issuance of the input cue signal and an input instructing means adapted to reissue the input cue signal when the voice is detected by the detection means. With this arrangement, it is possible to obtain a compact system which can serve a multiplicity of users without requiring substantial attention to the synchronization with the input cue signal.

Figure 3:
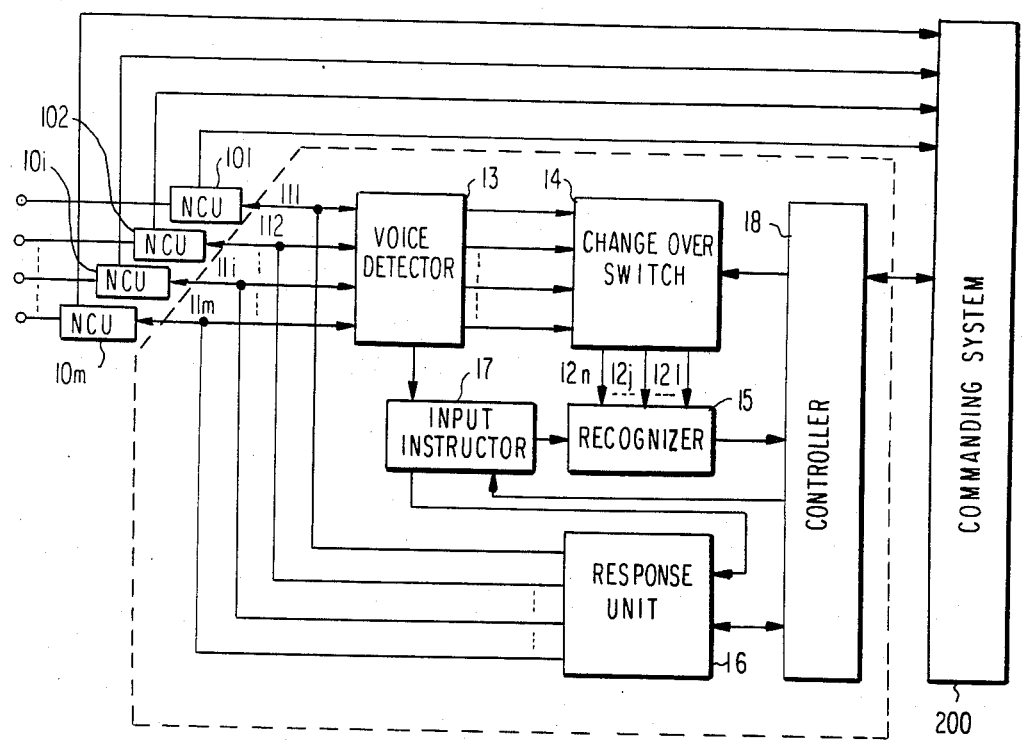
FIG. 3 is a block diagram of an embodiment of the invention.

The voice input system of this embodiment has a construction substantially as shown in FIG. 3. As will be seen from this figure, the voice input system of this embodiment has m (being an integer) user channels 111, 112, ... 11m. A response means 16 delivers voice output to each one of the user channels. A voice detection means 13 detects the inputted voice from each one of the user channels. A change-over switch 14 connects m voice pattern outputs to n (n being an integer smaller than m) separate recognition input terminals 121, 122, ..., 12j, ..., 12n of a recognition means 15 which recognizes the voices received on its n separate recognition input terminals as the outputs from the change-over switch 14. A control means connects, only in the presence of an inactive recognition input terminal or terminals, the user channel 111–11m on duty to an idle recognition input terminal of the recognition means 15 and further issues a voice input request. An input instructing means 17 delivers, when the detecting means 13 detects no voice in advance of receiving the voice input requests, a voice output to the user channel 111–11m to inform the user that the system is ready to receive the voice input and also to give an instruction to start the operation of the recognition means 15. The input instructing means 17 further delivers, if the voice has been already detected by the detection means 13, a voice output calling upon the user to activate the voice input when the ending point of the voice is detected, thereby to re-start the operation of the recognition means.

In this embodiment, when the user calls the system over a telephone line, the telephone network control units (NCU) 101, 102, ..., 10i, ..., 10n, detect the call and inform the commanding system 200 of the detected signal. Then, the commanding system 200 offers the voice input and output services to m separate user channels. The operation of this system will be described hereinunder with reference to FIG. 4.

The control means 18 which has received the voice output command gives an instruction to the response means 16 to make the latter issue a voice output "Please tell your account number" to user circuit m. The response section 16, after the completion of the voice output, informs the commanding system through the control means 18 of the fact that the voice output is finished. The commanding system 200, upon receipt of this information, outputs a voice input command to the control means 18. Then, the control means 18 searches for any idle input terminal 121–12n at the recognition means 15. This search is made within the period A shown in FIG. 4. When an idle terminal is found, the change-over switch 14 operates to connect the requested user channel with the idle recognition input terminal, while transmitting a voice input request to the input instructing means 17. Upon receipt of the voice input request, the input instructing means 17 makes a judgement as to whether any voice has been detected, on the basis of the detection information from the detection means 13. This operation is made within the period B shown in FIG. 4. If it is confirmed that no voice has been detected, the input instructing means 17 operates to instruct the response means 16 to issue an output which is the voice input cue signal such as "Beep", and to instruct the recognition means 15 to commence the recognition operation for the input terminal connected to the user's channel.

More specifically, the recognition means 15 receives an analyzed pattern of the voice from the beginning to the end of the voice burst in accordance with the detected information, and makes a recognition of the voice word "one". The result of the recognition is transmitted to the commanding system 200 through the control means 18. However, when the commanding system produces a voice input command for calling upon the user to utter the next word "two", and the control means 18 delivers the voice input request for the input cue signal "Beep" to the input instructing means 17 after a certain delay (which corresponds to the waiting time until the user's channel is connected with the idle recognition input terminal), the user may utter a word before the input cue signal is issued, as is the case of first "two" in FIG. 4. In this case, since the initial portion of the pronunciation of the word is lacking, the input instructing means 17 judges that the voice has been detected prior to the time of the voice input request. Then the input instructing means 17, after waiting for the end of the voice burst, instructs the response means to produce a voice output "Once more please 'Beep'" and starts the operation of the recognition means 15. Thus, the recognition means 15 does not operate within the period of the first "two" but recognizes the inputted voice within the period of the second "two".

Figure 6:
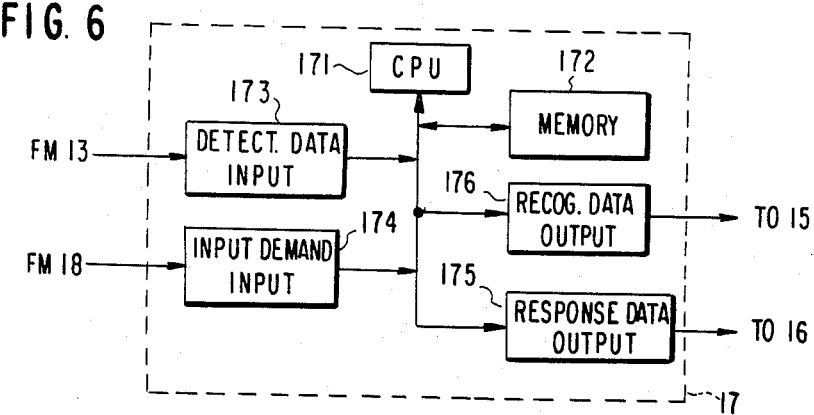

The change-over switch 14 shown in FIG. 3 has the same construction as those shown in FIGS. 6 and 8 of the United States Patent mentioned previously. Namely, the change-over switch 14 has m separate user channels 111, 112, ..., 11$i$, ..., 11$m$ as its inputs and n separate output lines connected to the recognition means input terminals 121, 122, ..., 12$j$, ..., 12$n$. In operation, the change-over switch 14 connects only those carrying the voice input request from the user circuits 111, 112, ... 11$i$, ..., 11$m$ to the input terminals 122, 122, ..., 12$j$, ..., 12$n$ of the recognition means 15.

The response means 16, for example may be constituted by a device which is shown in FIG. 2, page 340 of an article entitled "A Multiline Computer Voice Response System Utilizing ADPCM Coded Speech", pp 339-352 of IEEE Transactions on ASSP, issued November, 1974.

Namely, the response means 16 delivers to the m separate user channels a visible display of the sentence reading "This is telephone center. Please input your service code." or a voice input cue signal such as "Beep" in accordance with the instructions of the control means 18 or the input instructing means 17.

Figure 5:
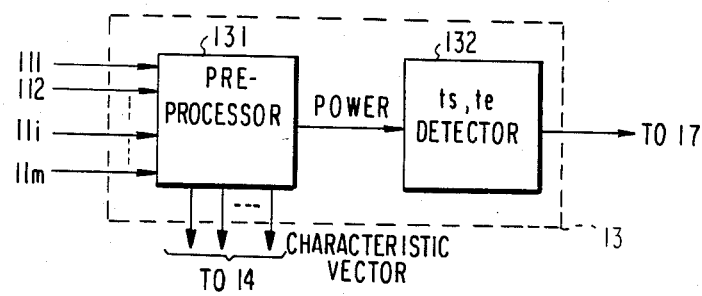
FIGS. 5 and 6 are detailed block diagrams of a voice detecting means 13 and an input instructing means 17 of the embodiment shown in FIG. 3.

The voice recognition means, for example, may be constituted by a device which is shown in FIG. 5 attached to an article entitled "Practical Applications of Voice Input to Machines", pp 405-415 of PROCEEDINGS OF THE IEEE, April 1976. Namely, the voice recognition means may include a pre-processing section that analyzes the voice to form power information and a characteristic vector (spectrum information), a voice detection section that detects the time at which the voice is sounded, a characteristic extraction section that derives the characteristics of the inputted voice, and an identification section that identifies the category of the voice, i.e. the category of the pronounced sound.

In this embodiment, the pre-processing section and the voice detection section are separated from the characteristic extraction section and the identification section, as shown in FIG. 3, and a change-over switch 14 is disposed therebetween. In operation, the i-th user's voice is inputted to the input channel 11$i$ of the voice detection section 3 for the detection of the timing at which the voice sound is uttered, and the detected information is sent to the input instructing section 17. The voice carried through the user channel i is further transmitted through the change-over switch 14 and sent to the recognition input terminal 12$j$. The recognition means 15 is capable of conducting the extraction or derivation of sound features and the identification of the voice. The recogniton means 15 can recognize n separate voice simultaneously. The recognition results by the recognition means 15 are delivered to the control section 18.

As will be seen from FIG. 5, the voice detecting means 13 analyzes the voices through m separate user channels in the pre-processing section 131, and delivers the result of the analysis, i.e. the characteristic vector, to the change-over switch 14, while delivering the voice power information to the detection section 132 for detecting the beginning point $t_s$ and the ending point $t_e$ of the voice.

The detection of the beginning point and the ending point of the voice burst is made as follows. Namely, when the input voice level has exceeded a predetermined consonant level $Th_1$ at a moment $t_s$ and then exceeded a predetermined vowel level $Th_2$, the moment $t_s$ is regarded as the beginning point. On the other hand, the detection of the ending point $t_e$ of the voice is made in the following manner. Namely, when the voice level falls below the consonant level $Th_1$ at a moment $t_e$ and, for a predetermined time period LE thereafter, stays under this level $TH_1$, the moment $t_e$ is regarded as the ending point. The beginning point $t_s$ and the ending point $t_e$ thus determined are delivered to the input instructing means 17. It will be clear to those skilled in the art that the arrangement of the voice detecting section 13 can readily be obtained.

As will be seen from FIG. 6, the input instructing means 17 is constituted by a microprocessor 171, memory 172, detected information inputting section 173, input request information inputting section 174, response information outputting section 175, and a recognition information outputting section 176. The microprocessor 171 operates in accordance with the flow chart shown in FIGS. 7A to 7C. Namely, in the first block 701, the states $R_i$, $W_i$ of the user channel i being used are reset. ($R_i=0$ means that the recognition operation has not been started yet, while $W_i=0$ means that no voice has been detected in advance of the start of the recognition). Subsequently, in a step 702, detected information data (identification of the user channel i, beginning point $t_s$, ending point $t_e$) are inputted from the voice detection means 13.

When the detected information concerns the beginning point of the voice burst, the process proceeds in accordance with the block 703. Namely, when the recognition process has been started, i.e. when condition of $R_i=1$ is met, the beginning point $t_s$ of the voice on the recognition input terminal j(i), which has been connected from the user's channel by the ohange-over switch 14, is delivered to the recognition means 15. On the other hand, when the recognition operation has not been started, i.e. when the condition $R_i=0$ is met, it is judged that the voice has been sounded before the user channel i is connected with the recognition means 15, and this state $W_i=1$ is recorded.

Figures 7A, 7B:
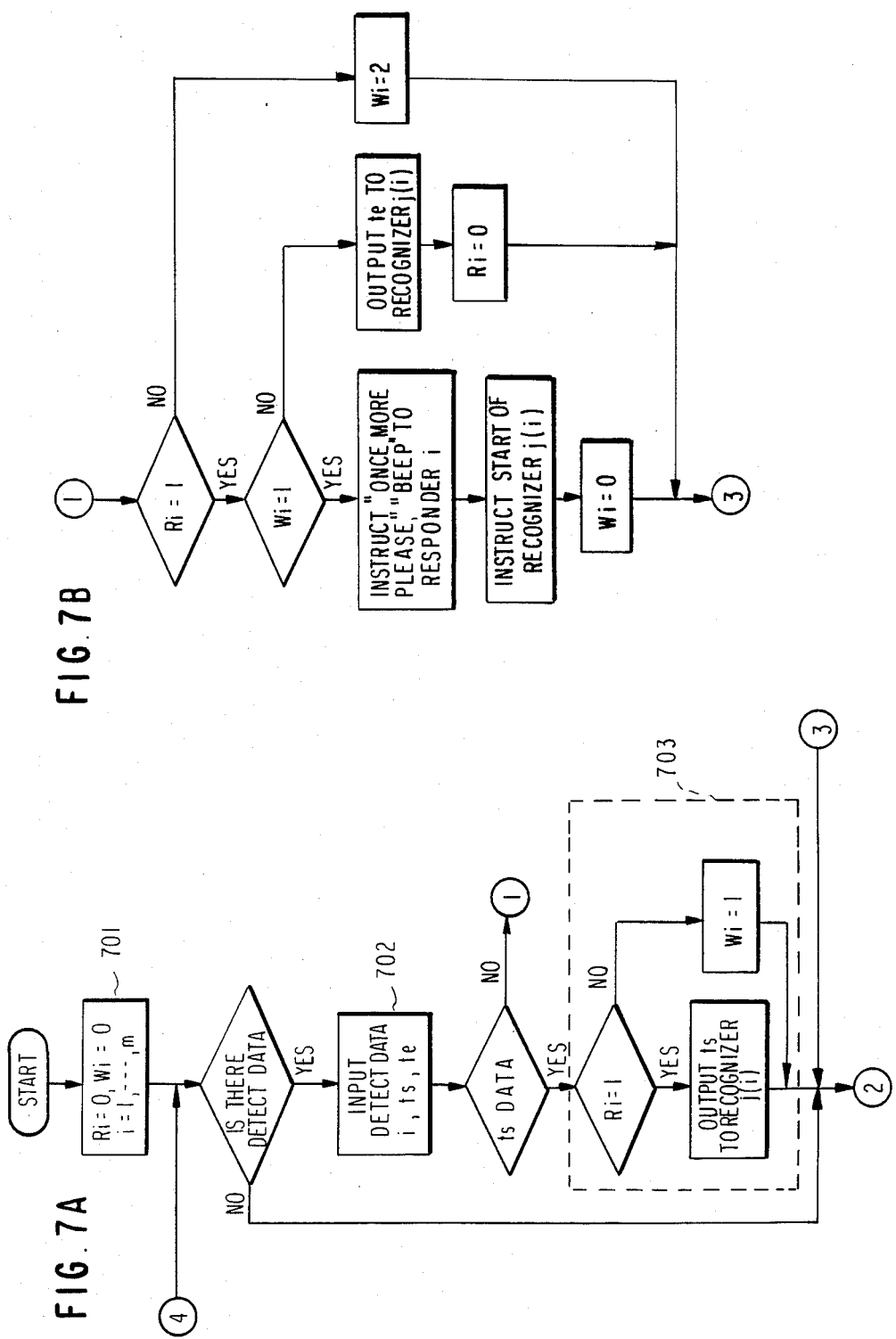
FIGS. 7A to 7C are flow charts showing the operation of the input instructing means of the embodiment shown in FIG. 3.

On the other hand, when the detected information concerns the ending point of the voice, the process proceeds in accordance with FIG. 7B. Namely, when the recognition operation has not been started yet ($R_i=0$), it is judged that the voice burst has ended and this state ($W_i=2$) is recorded. In case of $R_i=1$ and $W_i=0$, the ending point $t_e$ of the voice on the recognition input terminal j(i) is delivered to the recognimeans 15. However, in the case of $R_i=1$ and $W_i=1$, since the voice has been just detected, the response information data (identification of user channel i and the sound input cue signal "Once more please 'Beep'" as the response) are delivered" to the response section 16.

Figure 7C:
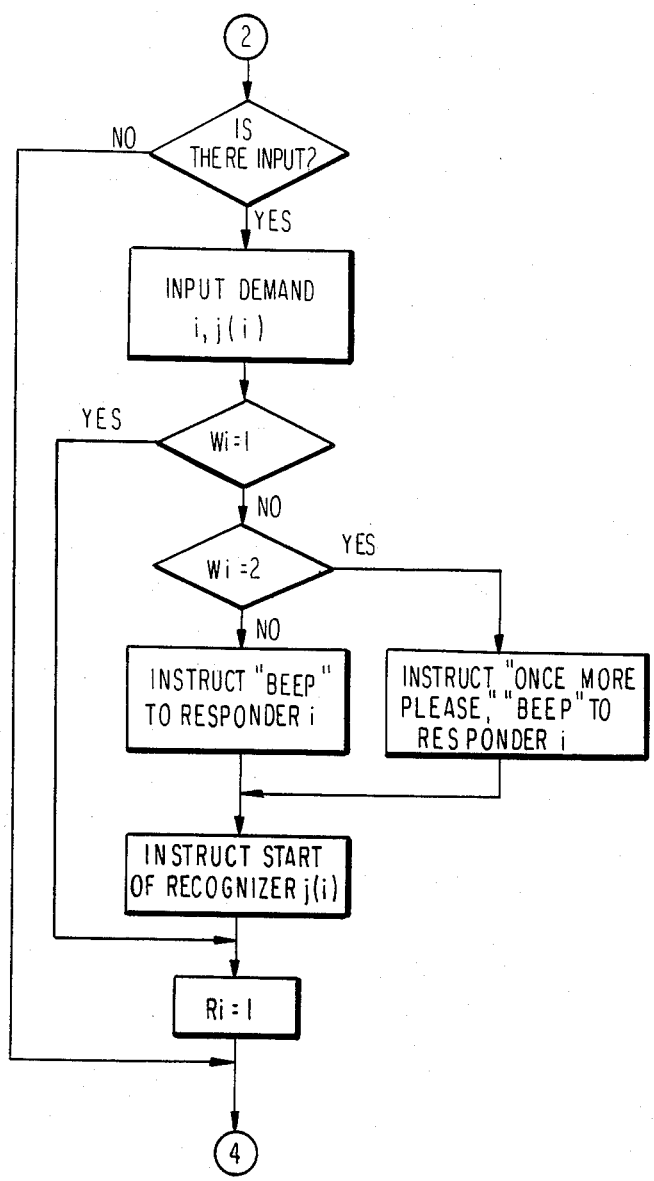

Then as shown in FIG. 7C, the input request information data (identification of user channel i and recognition input terminal j(i)) are inputted from the control means 18. In the case of $W_i=0$, since no voice has been detected in advance of the moment of the voice input request, an output "Beep" is delivered to the response means 16 and an instruction is given to the recognition means 15 to commence the recognition process of the voice on the recognition input terminal j(i). At the same time, this state ($R_i=1$), i.e. the fact that that recognition has been started, is recorded.

In the case of $W_i=1$, since the voice has been detected in advance to the voice input demand time, the condition of $R_i=1$ is established and the process waits for the detection of the ending point of voice sound. Furthermore, in the case of $W_i=2$, the voice has been ended in advance of the moment at which the input request is issued. Therefore, an instruction is given to the response means 16 to make the latter produce an output "Once more please 'Beep'". At the same time, the recognition means 15 is instructed to start the recognition process of the recognition input terminal j(i) and the condition of $R_i=1$ is established.

The process explained above with regard to blocks 702, 703 and FIGS. 7B and 7C is repeated to permit the system to deal with m separate user channels.

The control means 8 can have an arrangement as shown in FIG. 2 of the aforementioned United States Patent, and operates in accordance with the flow chart shown in FIG. 4 attached to the specification of this U.S. patent.

The second embodiment described above is used together with a telephone network and a commanding system which operates in accordance with an application program. As a user calls the system through telephone line as shown in FIG. 2, the call is detected by a telephone network control unit 10i and is sent to the commanding system 200. The commanding system 200 then issues the voice input command and voice output command to the control means 18 thereby to offer the service for the user circuit 11i.

Although the invention has been described through specific embodiments, it will be clear to those skilled in the art that the arrangement may be such that m or n separate voice detection means, recognition means and response means are arrayed for m input channels. In the described embodiment, the input instructing means and the control means are composed of microprocessors. Therefore, if a CPU has a sufficient capability it is possible to arange them such that the input instructing means and the control means make common use of the CPU and the memory. In this case, it is possible to omit one CPU and one memory.

As has been described, according to the invention, there is provided a system in which a change-over switch is provided at the preceding step to the recognition processing section to permit a time-sharing use of the recogniton processing means, and the proper timing of the use of the voice input is conveyed to the user by way of a voice input cue signal. With this arrangement, it is possible to reduce the number of the simultaneous processing circuits down to n which is smaller than the number m of ther user channels and, hence, to reduce the size of the system ad a whole.

Furthermore, in the system of the invention, a voice detection means is provided at the preceding state to the change-over switch to always survey the voice input from the user channels. In addition, when the user has sounded his voice without waiting for the voice input cue signal, an input instructing means operates to ask the user to repeat the voice input. Therefore, even when the user has uttered the voice before the voice input cue signal is given, it is possible to avoid any misrecognition of an imperfectly received input.

Thus the invention provides a voice input system which is quite easy for any user to use.

What is claimed is:

1. A voice input system, comprising:
   an input cue signal generating means for producing a first cue signal informing the user that the system is ready to receive the voice input;
   a voice detection means for producing a detection signal when the voice signal is being inputted; and
   an input instructing means for ordering said input cue signal generating means to issue a second input cue signal when said detection signal exists prior to the end of said input cueing signal.

2. A voice input system as recited in claim 1, further comprising:
   voice processing means for effecting predetermined processing on the inputted voice signal.

3. A voice signal input system according to claim 2, wherein said voice detection means includes means for determining a starting time $t_s$, when the level of the voice input signal has exceeded a predetermined level $Th_1$ at a moment $t_s$ and then exceeded a predetermined level $Th_2$ thereafter, and for determining an ending time $t_e$, when the level of the voice input signal has come down below the level $Th_1$ at a moment $t_e$ and stays below this level for a predetermined period thereafter.

4. A voice signal input system according to claim 2, wherein the voice processing means comprises means for recognizing the inputted voice signal.

5. A voice input system, comprising;
   m (being an integer) separate user channels;
   response means for delivering voice output to any of said user channels;
   voice detection means for detecting the voice inputs on any of said user channels;
   a change-over switch for selectively supplying m voice signals to any of n (n being an integer smaller than m) separate recognition input terminals;
   processing means for processing the voices received from said n input terminals;
   control means for connecting, only in the presence of at least one idle input terminal in the recognition means, said user channel in use to one of the idle input terminals and for issuing a voice input request; and
   input instructing means for delivering, when the detecting means detects no voice in advance of the time at which the voice input request is received, a voice output to said user channel to inform the user that the system is ready to receive the voice input and for giving an instruction to start the operation of said processing means, the input instructing means further delivering, when the voice is detected by said detection means, a voice output calling upon the user to activate the voice input at the moment at which the ending point of the voice is detected, thereby starting the operation of said processing means.

6. A voice signal input system according to claim 5, wherein said voice detection means includes means for extracting voice characteristic information and power information of the inputted voice and for detecting the input of the voice using the power information, the characteristic information being delivered as input to said change-over switch.

7. A voice input system according to claim 6, wherein said voice detection means detects, when the level of the input voice signal has exceeded a predetermined consonant level $Th_1$ at a moment $t_s$ and thereafter has exceeded a predetermined vowel level $Th_2$, the moment $t_s$ as the beginning point and, when said input voice signal has fallen below $Th_1$ at a moment $t_e$ and has stayed below $Th_1$ for a predetermined period thereafter, the moment $t_e$ as the ending time.

8. A voice input system according to claim 5, wherein said voice processing means includes means for recognizing the input voice.

* * * * *